Nov. 3, 1953   F. T. BARR ET AL   2,657,986
PRODUCTION OF WATER GAS
Filed Aug. 15, 1946
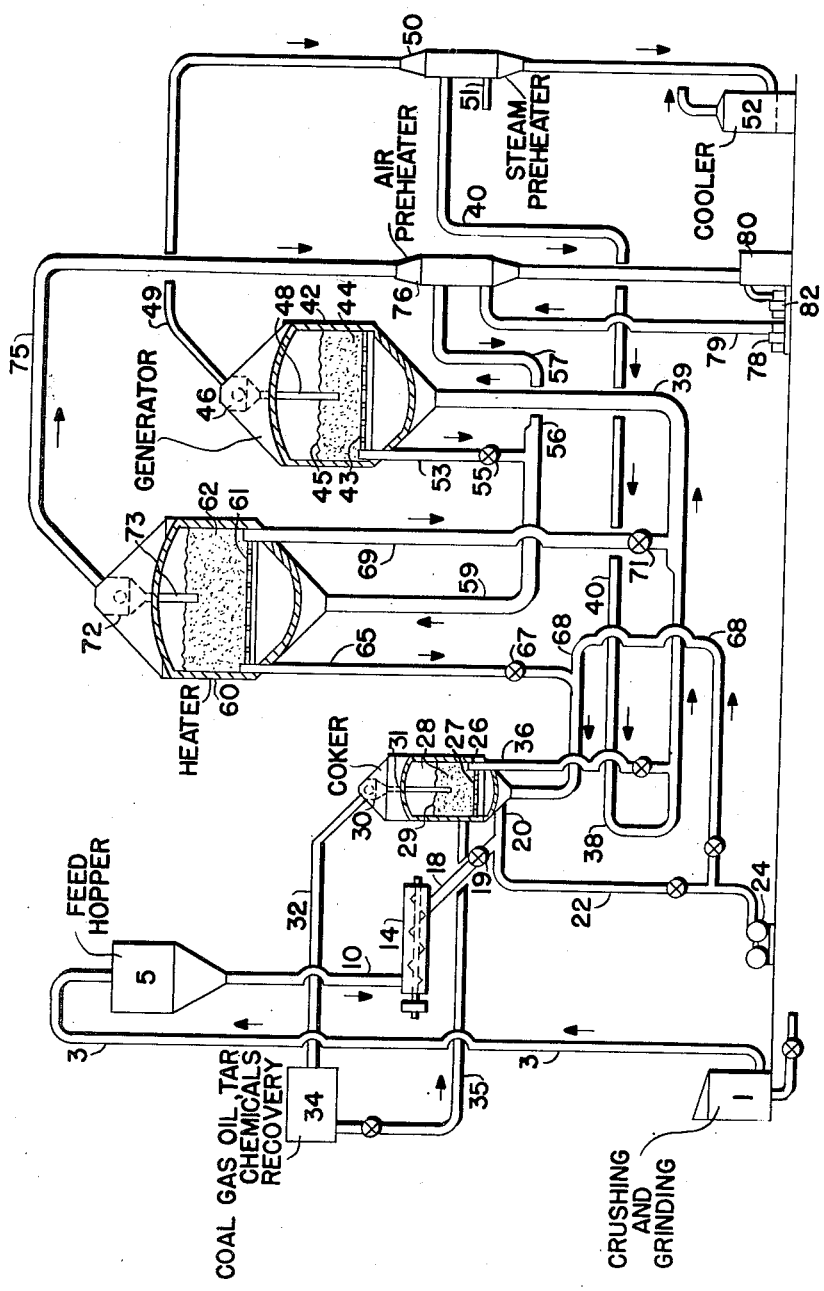
Frank T. Barr
Karl J. Nelson   Inventors
By   J Cashman
   Attorney Patented Nov. 3, 1953

2,657,986

UNITED STATES PATENT OFFICE 2,657,986

PRODUCTION OF WATER GAS

Frank T. Barr, Summit, and Karl J. Nelson, Cranford, N. J., assignors to Standard Oil Development Company, a corporation of Delaware Application August 15, 1946, Serial No. 690,816

3 Claims. (Cl. 48—206)

The present invention relates to the production of gases from non-gaseous carbonaceous materials and more particularly to the production of gas mixtures containing carbon monoxide and hydrogen, such as water gas, from such solid carbonaceous materials as coke, various coals, lignites, brown coals, peat, oil shale, oil coke, tar sands, cellulosic materials including lignin, and the like.

It has long been known that solid fuel materials, such as coal, coke and the like, may be converted into more valuable gases which can be more easily handled and more efficiently used for a greater variety of purposes. One of the most widely practiced gas-generating conversions is the so-called water gas process in which solid fuels, such as coal or coke of any origin, are reacted with steam at temperatures of about 1400° to 3000° F., to produce water-gas mixtures of carbon monoxide and hydrogen in varying proportions, depending mainly on the time of contact, conversion temperatures and the feed ratio of steam. The overall water gas reaction being endothermic, heat must be supplied which is usually accomplished by the combustion of a portion of the carbonaceous feed with an oxidizing gas, such as air and/or oxygen, at about 1600° to 3000° F. The combustion reaction may be carried out either simultaneously with the water gas reaction or alternately in a make and flow fashion.

The water gas process permits the production of gas mixtures of widely varying compositions and B. t. u. content. The process as such, therefore, is extremely well suited not only for the production of fuel gases of varied B. t. u. content but also for the production of gases for hydrogenation processes and particularly for the catalytic synthesis of hydrocarbons and/or oxygenated organic compounds from carbon monoxide and hydrogen, which, depending on the products desired, requires $H_2:CO$ ratios varying within the wide limits of 0.5 to 5 volumes of $H_2$ per volume of CO.

However, the technical utilization of the water gas process, particularly for hydrogenation processes and the production of synthesis gas, has been appreciably impeded by difficulties encountered particularly in heat supply, continuity of operation and limitations in temperature imposed by low ash fusion or softening points. The problem of continuity of operation has been satisfactorily solved heretofore by the application of the so-called fluid solids technique wherein the carbonaceous charge is reacted in the form of a dense turbulent mass of finely divided solids fluidized by the gaseous reactants and products.

With respect to heat supply, such processes contemplate either generation of heat by combustion of carbonaceous materials within the gas generator or a continued circulation of solid carbonaceous material in a fluidized state to a separate heater in which heat is generated by combustion of the carbonaceous constituents of the residue, and recirculation of the highly heated solid fluidized combustion residue to the gas generation zone to supply the heat required therein.

When the heat is generated by burning carbonaceous solids within a gas generator employing the fluid solids technique for a continuous production of water gas, highly concentrated oxygen rather than air must be used as the oxidizing gas to avoid dilution of the product gas with large proportions of nitrogen. When the heat is generated by combustion in a separate heater as outlined above, considerable difficulties result from the limitations necessarily imposed on the practical temperature difference between the heater and gas generator. In order to maintain solids circulation within reasonable limits, this difference should be as large as possible. The conversion of steam in the water gas reaction increases under otherwise equal conditions with increasing temperatures in the range of about 1600° to 2100° F.; it may amount to about 25 to 50% at temperatures up to about 1700° F., to about 85% at about 2000° F. and to about 98 to 99% at temperatures of 2100° F. and above. The gas generator temperature should, therefore, be as high as the heat resistance of economical construction materials available for fluid equipment and the fusion or softening point of the ash permit. However, the same factors limit the heater temperature. It follows that, even if the heater is operated at highest temperatures attainable in technically practical equipment and commensurate with the ash fusion or softening point which lies in the neighborhood of about 2000° F. for such materials as high chrome-nickel steel and reasonably priced ceramic-lined steel, and for most coal ashes the gas generator will have to operate at a temperature below about 2000° F., i. e. far below the optimum temperature range no matter how high the rate of circulation of heat carrying solids may be chosen. As a result, steam conversion remains incomplete and the process has a low degree of efficiency or required conversion space is excessive. Similar difficulties arise when the combustion is carried out within the gas generator itself because the temperature may not be raised above about 2000° F. in economically practical technical equipment and without troubles arisen from ash fusion or softening.

These difficulties are particularly pronounced when the gasification reaction is to be carried out under elevated pressure above say 20 lbs. per sq. in. gauge because the rate of steam conversion drops rapidly when the pressure is increased and this drop in rate of conversion must be compensated for by a corresponding increase in temperature or increase in contact time.

The present invention overcomes the aforementioned difficulties and affords various additional advantages. These advantages, the nature of the invention and the manner in which it is carried out, will be fully understood from the following description thereof read with reference to the accompanying drawing.

It is, therefore, the principal object of our invention to provide an improved process for the production of gas mixtures containing carbon monoxide and hydrogen.

Another object of our invention is to provide a process for the production of water gas from carbonaceous materials and steam involving an increased conversion of steam by more economical means.

A more specific object of our invention is to provide an improved process employing the fluid solids technique for the production of water gas by reacting solid carbonaceous materials with steam and supplying heat of reaction by the combustion of carbonaceous materials.

Other objects and advantages of our invention will appear hereinafter.

We have found that these objects may be accomplished quite generally by employing in a fluid gas generator solid carbonaceous charging material of relatively high chemical reactivity. In this manner, the steam conversion at a given temperature and under otherwise equal conditions may be considerably increased and the gas generator may be operated at temperatures considerably below the gas generation temperatures required for other feed material under similar conditions of pressure, steam concentration, contact time, carbon concentration, etc. without detrimentally affecting the steam conversion.

In general, carbonaceous solids which have an oxidation reactivity of $T_{15}$ of 200°–250° C. and of $T_{75}$ of 250°–300° C. are suitable for our process.[1] Our preferred highly reactive carbonaceous starting material is low temperature coke obtained by carbonizing coal at temperatures not substantially higher than 1000° F., and preferably within the range of 600° to 950° F., to an oxidation reactivity of about $T_{15}=200°–210°$ C. and $T_{75}=250°–260°$ C. When low temperature coke of this type is charged to a fluid gas generator the gasification temperature may be lowered as much as about 100°–200° F. beneath the level required for conventional charging materials such as coal or high temperature coke, without affecting steam conversion under otherwise equal conditions. Substantially complete steam conversion of 98 to 99% may be achieved at temperatures in the neighborhood of about 1900° F., while at 1700° F. the steam conversion still amounts to about 80%. Gas generator plugging which may be a danger in fixed bed operation as a result of the use of a charge of low mechanical strength is avoided when the fluid solids technique is applied. Thus,

[1] Sebastian and Mayers, Ind. Eng. Chem. 129:1118 (1937) $T_{15}$ and $T_{75}$ are the temperatures at which the rate of heat release by oxidation of a sized sample becomes great enough to raise its temperature at rates of 15° C. per minute and 75° C. per minute respectively.

the gas generation reaction may be efficiently conducted below the upper temperature limits drawn by the heat resistance of economic construction materials and the ash fusion or softening point.

Other suitable highly reactive charging materials include certain bituminous or sub-bituminous coal, lignites, brown coals, etc. uncoked or coked, at temperatures not substantially above 1000° F. preferably between about 600° and 1000° F., whose oxidation reactivity falls within the limits indicated above. Whenever a preparation such as carbonization, drying, oxidation, etc. of the charging material is required or advisable in order to attain the desired high degree of reactivity, we prefer to employ the fluid solids technique for the purpose because this technique affords the greatest advantages with respect to temperature control and constancy as well as uniformity and constancy of product composition and reactivity.

The heat required for the gasification reaction and charge preparation is preferably generated by combustion in a separate heater and circulation of highly heated solid combustion residue to the zones of heat consumption, although combustion within the latter zones by means of air and/or oxygen may be applied instead or in addition to a separate heater, if desired. Thus, when employing the fluid solids technique, we prefer to use a system similar to that described in the copending F. T. Barr application, Serial Number 619,874 filed October 2, 1945, wherein carbonaceous residue from a fluidized gas generator bed is subjected in the form of a fluidized bed to combustion in a separate heater and the sensible heat of hot combustion residue is used to supply the heat required in the gas generator. No matter, however, which method of heat supply is chosen the advantage of increased steam conversion or reduced gasification temperature will be fully realized when using our highly reactive gasification charge outlined above.

In application Serial No. 702,992, filed in the name of Frank T. Barr on October 12, 1946, there is set forth the concept that in the low temperature carbonization of carbonizable solids undesired tar fractions are recycled to the carbonization zone to be converted into gas, light oils and coke whereby the yields of desirable products and the reactivity of the coke in the water gas reaction are increased.

Having set forth its general nature and objects, our invention will be best understood from the subsequent more detailed description in which reference will be made to the accompanying drawing which illustrates a system suitable for carrying out the preferred embodiment of the invention.

Referring now in detail to the drawing, a solid carbonizable fuel is crushed or pulverized in crusher 1 to a finely divided form, for example, of the order of 50% having a size of less than 100 mesh, though small lumps of up to ¼ or ½ inch size may be used. For the purposes of the following description, the carbonaceous material will be referred to as a bituminous carbonization coal containing 30–35% volatile matter, but other materials can be used.

The properly sized carbonization coal is hoisted or conveyed in any manner known per se through line 3 to feed hopper 5. From here it is fed through line 10 provided with screw feeder 14 into pipe 18 provided with control valve 19 and then into a dispersing chamber 20. The finely divided coal is dispersed in dispersing chamber 20 in a stream of "fluidizing" gas, such as superheated steam, nitrogen, flue gases, carbonization gases or vapors, or the like, supplied through line 22 by compressor 24. The solids in the dispersion are now in the so-called fluidized state in which they are capable of flowing through pipes, valves, etc. similar to a liquid and exhibiting static and dynamic heads.

The fluidized coal enters the conical lower portion of the enlarged cylindrical carbonization chamber 26 and passes through a distributing grid 27 into the carbonization zone 28 where the carbonization coal is subjected in the form of a dense ebullient fluidized mass forming a well defined upper level 29 to coking temperatures of between about 600° and 950° F., preferably around 900° F. The heat required for the carbonization reaction is preferably supplied by highly heated solids recirculated from combustion chamber 60 through line 65 as will appear more clearly hereinafter. Volatile carbonization products containing small amounts of solids fines are passed through a gas-solids separator 30 which may be a centrifugal or electric type precipitator, and through line 32 to any conventional system 34 for the recovery of such volatile carbonization products as coal gas, oil, tar, chemicals, etc. Undesired tar fractions may be returned through line 35 to chamber 26 to be converted into gas in the course of the carbonization treatment. Solids separated in 30 are recycled through pipe 31 to the dense phase in 28.

Fluidized low temperature carbonization coke is withdrawn from carbonization chamber 26 at a point above grid 27 through pipe 36, and passed through control valve 37 to dispersing conduit 38 where it is taken up by highly heated steam supplied from steam preheater 50 through line 40. From dispersing conduit 38 the fluidized coke is passed through line 39 into the lower conical portion of the cylindrical gas generator 42 provided with distributing grid 43 in an arrangement similar to that of carbonization chamber 26.

The gas generator is maintained at a temperature of between about 1600° and 1900° F., preferably about 1700°–1800° F. and a pressure of about 40–60 lbs. per sq. in. gauge to permit the water gas reaction to take place between the steam and the coke maintained in a dense, ebullient mass 44 forming a level 45 in generator 42. The heat required for the water gas reaction is supplied by highly heated solid residues recirculated from combustion zone 60 through line 69 at the desired temperature, as will appear more clearly hereinafter. At these conditions, the conversion of steam to carbon monoxide and hydrogen amounts to about 80 to 90% of the theoretical as compared with about 30 to 60% when a conventional gasification charge such as high temperature coke is used. The relative amounts and the contact time of coke and steam supplied to generator 42 are so controlled that about 80 to 90% of the steam is converted to $H_2$ and CO and about 80 to 98% of the coke is efficiently utilized in the combined heat and water gas generation.

A gas consisting mainly of carbon monoxide and hydrogen is taken overhead from generator 42 and freed in gas-solids separator 46 from entrained fines which may be returned through pipe 48 to the dense phase 44. The gas leaves separator 46 through line 49 and passes through steam preheater 50 in heat exchange with steam admitted through line 51, to a cooling system 52 from which it may be withdrawn for any desired use as a fuel gas, for hydrocarbon synthesis, and others. Tower 52 may also be a scrubber for removal of any traces of suspended solids not separated in 46. The steam preheated in 50 passes through line 40 to dispersing conduit 38, as outlined above.

Solid carbonaceous gasification residue is withdrawn through vertical pipe 53 from a point above grid 43 and passed through control valve 55 to dispersing conduit 56 where it is taken up by hot air, oxygen, or other oxidizing gas supplied through line 57, as will appear more clearly below. The mixture of solid gasification residue and oxidizing gas passes at about the temperature of the gasification zone through line 59 to the conical lower portion of the cylindrical combustion chamber 60 which has a construction similar to that of chambers 26 and 42 and serves as a heater for zones 26 and 42. The solids-gas mixture enters the cylindrical portion of heater 60 through a distributing grid 61 and forms thereabove a fluidized dense ebullient phase 62 having a well defined upper level 63. The temperature of zone 62 is maintained between 1700° and 2000° F. preferably at about 1800° to 1900° F. Solid combustion residue consisting essentially of coal ash is returned from a point above grid 61 at about the temperature of the combustion zone 62 through vertical pipe 65 provided with control valve 67 to the lower portion of carbonization chamber 26 in amounts sufficient to supply the heat required for carbonization. This amount may vary between about 100% and 200% by weight of the solids charged through line 20, depending on the temperature difference between combustion zone 62 and carbonization zone 28, good results being, in general, obtained at a solid recycle ratio of about 100% to 150%. A fluidizing gas may be supplied by compressor 24 through line 68 to facilitate the transport of the solid through line 65.

Another considerably larger amount of solid combustion residue is withdrawn from above grid 61 through vertical pipe 69 provided with control valve 71 to be returned through line 39 to gas generator 42 to supply the heat required in gasification zone 44. In accordance with the considerably higher temperature and the normally larger dimensions of gas generator 42, the amount of solids recycled to 42 is a high multiple of that recycled to carbonization chamber 26 and may vary between the approximate limits of 30 to 300 times the carbon content of the solids charged through line 36 or may be about 20 to 100 times the amounts of solids returned through line 65.

Flue gases are withdrawn overhead from heater 60 through gas-solids separator 72 where they are freed from solid fines. The fines may be returned through vertical pipe 73 to the dense phase 62 or withdrawn from the system. Hot flue gas substantially free of solids is passed through line 75 to air preheater 76 where it preheats the air supplied by compressor 78 through line 79. The preheated air passes through line 57 into dispersing conduit 56 as shown above. Flue gas, if desired after further dust removal in 80, may then be applied to any desired use, such as the operation of a flue gas turbine 82, for heat recovery, or discarded.

The superficial gas velocity in reactors 26, 42, and 60 are those commonly used for the fluidization of dense beds of solids of the particle size indicated and may range from about 0.3 to 10 ft, per second, preferably between about 0.5 to 3 ft. per second. The pressure of the system may be essentially atmospheric but is preferably kept within the approximate limits of 40 to 200 lbs. per sq. in. gauge to save compression on the gas manufactured. Higher pressures may be used as feasibility and economy of contruction techniques allow, particularly if water gas of high B. t. u. value is desired. Our invention is particularly well adapted to high pressure operation since high steam conversion can be obtained at reasonable temperature even at the highest pressures desirable for gasification.

Means may be provided to withdraw ash from suitable points of the system in any manner known per se, for instance from pipes 65 and/or 69 in order to avoid a build up of ash in the system. If desired, an oxidizing gas such as air and/or oxygen may be supplied to chambers 26 and/or 42 to generate heat by combustion therein, in order to supplement or replace the heat supplied from heater 60. Other modifications of our invention will appear to those skilled in the art.

Our invention will be further illustrated by the following specific example.

*Example*

The superiority of the process of the invention over the gasification of a conventional gasification charge is illustrated by the data given below which summarize the essential conditions of water gas manufacture in a system of the type specifically described above and illustrated in the drawing, using conventional gasification feed on the one hand and gasification feed of the invention on the other hand.

Raw Coal inspection:
    Ash, percent----------------------------------- 8.0
    Volatile matter, percent----------------------- 37.5
    Fixed carbon, percent-------------------------- 54.5
    B. t. u.--------------------------------------- 13,710
    Fusion temperature, °F------------------------- 2,150

|  | Conventional Gasification Feed | Present Gasification Feed |
|---|---|---|
| Carbonization Temperature, °F | 1,700 | 900 |
| Coke Reactivity: | | |
| $T_{15}$, °C | 415 | 205 |
| $T_{75}$, °C | 495 | 250 |
| Gasification Temperature, °F | 1,800 | 1,800 |
| Gasification Pressure, p. s. i. g | 45 | 45 |
| Fluid Bed Height, Ft | 32 | 32 |
| Fluid Bed Density, Lbs./C. F | 20 | 20 |
| Inlet Steam Velocity, Ft./Sec | 0.5 | 0.5 |
| Carbon Concentration, Wt. Percent of Solids | 20 | 20 |
| Steam Conversion, Wt. Percent | 50 | 90 |

The above data demonstate that steam conversion may be almost doubled when operating in accordance with the present invention under otherwise equal conditions.

While the foregoing description and exemplary operations have served to illustrate specific applications and results of our invention, other modifications obvious to those skilled in the art are within the scope of our invention. Only such limitations should be imposed on our invention as are indicated in the appended claims.

We claim:

1. The process of producing gas mixtures containing carbon monoxide and hydrogen from solid carbonaceous materials and steam which comprises contacting steam in a gasification zone at gasification temperatures with a dense ebullient mass of finely divided carbonaceous solids fluidized by an upwardly flowing gas to resemble a boiling liquid having a well defined upper level, said carbonaceous solids being low temperature carbonization coke formed by coking carbonaceous material in a coking zone at temperatures within the range of from about 600°–900° F. to produce a coke having an oxidation reactivity of about $T_{15}=200°–210°$ C. and $T_{75}=250°–260°$ C. to produce carbon monoxide and hydrogen when treated with steam at gasification temperatures, withdrawing coke from said coking zone and passing it directly to said gasification zone, withdrawing solid carbonaceous gasification residue from said gasification zone and passing it to a combustion zone, subjecting said solid carbonaceous gasification residue to combustion with an oxidizing gas in said combustion zone to generate heat and supplying heat of combustion to said gasification zone as sensible heat of finely divided combustion residue returned to said mass by withdrawing hot carbonaceous solids from said combustion zone and passing them with said carbonaceous solids withdrawn from said coking zone to said gasification zone.

2. The process of claim 1 in which said gasification is carried out at a pressure above 40 lbs. per sq. in. gauge.

3. The process of claim 1 wherein the solids in said separate combustion zone are maintained in the form of a dense ebullient mass of finely divided solids fluidized by an upwardly flowing gas to resemble a boiling liquid having a well defined upper level.

FRANK T. BARR.
KARL J. NELSON.

References Cited in the file of this patent

UNITED STATES PATENTS

| Number | Name | Date |
|---|---|---|
| 1,776,876 | Winkler | Sept. 30, 1930 |
| 1,857,799 | Winkler | May 10, 1932 |
| 2,187,872 | Winkler et al. | Jan. 23, 1940 |
| 2,436,938 | Scharmann et al. | Mar. 2, 1948 |
| 2,482,187 | Johnson | Sept. 20, 1949 |
| 2,579,398 | Roetheli | Dec. 18, 1951 |

FOREIGN PATENTS

| Number | Country | Date |
|---|---|---|
| 310,686 | Great Britain | May 2, 1929 |

OTHER REFERENCES

Morgan: "A Textbook of American Gas Practice," vol. I, pp. 874–875.

Lowry: "Chemistry of Coal Utilization," vol. I, 1945, pp. 774, 775, 897, 900.

Wilson et al.: "Coal, Coke and Coal Chemicals," Chemical Engineering Series (1950), pages 418 and 419.